United States Patent
Chen et al.

(10) Patent No.: US 9,900,357 B2
(45) Date of Patent: Feb. 20, 2018

(54) RATE CONTROL

(71) Applicant: Microsoft Technology Licensing, LLC, Redmond, WA (US)

(72) Inventors: Mingyu Chen, Stockholm (SE); Adriana Dumitras, London (GB); Mattias Nilsson, Sundbyberg (SE); Renat Vafin, Tallinn (EE); Christoffer Asgaard Rödbro, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 390 days.

(21) Appl. No.: 14/023,304

(22) Filed: Sep. 10, 2013

(65) Prior Publication Data

US 2014/0372623 A1 Dec. 18, 2014

(30) Foreign Application Priority Data

Jun. 14, 2013 (GB) .................................. 1310665.3

(51) Int. Cl.
*G06F 15/16* (2006.01)
*H04L 29/06* (2006.01)
(Continued)

(52) U.S. Cl.
CPC .......... *H04L 65/4092* (2013.01); *H04L 47/11* (2013.01); *H04L 47/2416* (2013.01);
(Continued)

(58) Field of Classification Search
CPC ....... H04L 1/0002; H04L 65/60; H04L 69/24; H04L 43/0829; H04L 43/0852;
(Continued)

(56) References Cited

U.S. PATENT DOCUMENTS 8,259,570 B2 9/2012 Rodbro et al.
2001/0023445 A1* 9/2001 Sundqvist ..................... 709/228
(Continued)

FOREIGN PATENT DOCUMENTS

EP 1528722 A1 5/2005

OTHER PUBLICATIONS

"International Search Report & Written Opinion for PCT Application No. PCT/US2014/041817", dated Sep. 23, 2014, 9 Pages.
(Continued)

*Primary Examiner* — Liangche A Wang
*Assistant Examiner* — Johnny Aguiar
(74) *Attorney, Agent, or Firm* — Schwegman Lundberg & Woessner, P.A.

(57) ABSTRACT

There is provided a method of controlling a rate at which content data is received at a receiver over a network, wherein the receiver has caused a first stream of real-time communication event data to be received at the receiver, and a second stream of content data to be received at the receiver, the method comprising steps of: dynamically measuring network conditions of the network based on the real-time communication event data; and limiting the rate at which content data is received at the receiver based on the dynamically measured network conditions.

19 Claims, 6 Drawing Sheets

(51) Int. Cl.

| | |
|---|---|
| *H04L 12/835* | (2013.01) |
| *H04L 12/801* | (2013.01) |
| *H04L 12/853* | (2013.01) |
| *H04L 1/00* | (2006.01) |
| *H04W 28/22* | (2009.01) |
| *H04L 12/26* | (2006.01) |
| *H04L 12/825* | (2013.01) |

(52) U.S. Cl.
CPC ............. *H04L 47/25* (2013.01); *H04L 47/30* (2013.01); *H04L 69/24* (2013.01); *H04L 1/0002* (2013.01); *H04L 43/0829* (2013.01); *H04L 43/0852* (2013.01); *H04L 43/0894* (2013.01); *H04L 47/263* (2013.01); *H04L 65/604* (2013.01); *H04L 65/608* (2013.01); *H04L 65/80* (2013.01); *H04W 28/22* (2013.01)

(58) Field of Classification Search
CPC ... H04L 43/0894; H04L 47/10; H04L 47/193; H04L 47/25; H04L 47/263; H04L 47/30; H04W 28/02; H04W 28/10; H04W 28/22
USPC ....... 709/204, 217, 223, 224, 228, 231, 232, 709/233, 235; 370/229, 230, 231, 232, 370/235, 252, 465, 468
See application file for complete search history.

(56) References Cited

U.S. PATENT DOCUMENTS

| | | | |
|---|---|---|---|
| 2002/0080721 A1* | 6/2002 | Tobagi et al. ................. | 370/236 |
| 2004/0030797 A1* | 2/2004 | Akinlar et al. ............... | 709/232 |
| 2006/0018266 A1* | 1/2006 | Seo ............................... | 370/252 |
| 2006/0215556 A1* | 9/2006 | Wu .......................... | H04W 4/12 370/230 |
| 2009/0141631 A1* | 6/2009 | Kim et al. .................... | 370/235 |
| 2011/0128868 A1* | 6/2011 | Wurm et al. .................. | 370/252 |
| 2011/0205889 A1 | 8/2011 | Chen et al. | |
| 2012/0079132 A1* | 3/2012 | Liu et al. ...................... | 709/233 |
| 2012/0173748 A1* | 7/2012 | Bouazizi ....................... | 709/231 |
| 2013/0095764 A1 | 4/2013 | Rodbro et al. | |
| 2014/0136653 A1* | 5/2014 | Luby et al. ................... | 709/217 |

OTHER PUBLICATIONS

Kim, et al., "TCP-Friendly Internet Video Streaming Employing Variable Frame-Rate Encoding and Interpolation", In IEEE Transactions on Circuits and Systems for Video Technology, vol. 10, Issue 7, Oct. 2000, pp. 1164-1177.

Kim, et al., "Coexistence of VoIP and TCP in Wireless Multihop Networks", In Journal of IEEE Communications Magazine, vol. 47, Issue 6, Jun. 2009, pp. 7.

Zhang, et al., "Profiling Skype Video Calls: Rate Control and Video Quality", In Proceedings of the IEEE, Infocom, Mar. 25, 2012, pp. 9.

Goel, et al., "Low-Latency Adaptive Streaming over TCP", In Journal of the ACM Transactions on Multimedia Computing, Communications and Applications, vol. 4, Issue 3, Article 20, Aug. 2008, pp. 20.

Bu, et al., "On the TCP-Friendliness of VoIP Traffic", In Proceeding of the 25th IEEE International Conference on Computer Communications, Apr. 2006, pp. 12.

Papadimitriou, et al., "Assessment of Internet Voice Transport with TCP", In International Journal of Communication Systems, vol. 19, Issue 4, May 2006, pp. 25.

Xu, et al., "Video Telephony for End-consumers: Measurement Study of Google+, iChat, and Skype", In Proceedings of the ACM Conference on Internet Measurement Conference, Nov. 14, 2012, pp. 14.

Jayaram, et al., "A Call Admission and Control Scheme for Quality-of-Service (QoS) Provisioning in Next Generation Wireless Networks", In Journal of Wireless Networks, vol. 6, Issue 1, Feb. 2000, pp. 27.

"International Preliminary Report on Patentability", Application No. PCT/US2014/041817, dated Aug. 14, 2015, 6 pages.

\* cited by examiner

RATE CONTROL

RELATED APPLICATION

This application claims priority under 35 USC 119 or 365 to Great Britain Application No. 1310665.3 filed Jun. 14, 2013, the disclosure of which is incorporate in its entirety.

BACKGROUND

Some communication systems allow the user of a device, such as a personal computer or mobile device, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

During real time communication of audio/video, downloading and uploading of content can occur during the calls. For instance, a service provider may choose to distribute content (e.g. advertisements) to the users, or the users may share content such as photos, screenshots, and files. The distribution of content is typically based on the Hypertext Transfer Protocol (HTTP) or the Hypertext Transfer Protocol Secure (HTTPS) application protocols, with Transmission Control Protocol (TCP) as the default underlying transport protocol.

SUMMARY

Content data (transported in accordance with TCP) may be transmitted to a receiver over a network whilst communication event data is also transmitted to the receiver over the network during a communication event between the receiver and one or more further devices.

The inventors have recognised that the TCP content data is rather aggressive in nature in the sense that, it keeps increasing the sending rate until a buffer at a network node becomes full and loss occurs. This behaviour introduces packet loss and high delay jitter, which causes significant degradation in the quality of a concurrent audio/video call.

There is provided a method of controlling a rate at which content data is received at a receiver over a network, wherein the receiver has caused a first stream of real-time communication event data to be received at the receiver, and a second stream of content data to be received at the receiver, the method comprising steps of: dynamically measuring network conditions of the network based on the real-time communication event data; and limiting the rate at which the content data is received at the receiver based on the dynamically measured network conditions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present invention and to show how the same may be put into effect, reference will now be made, by way of example, to the following drawings in which.

DETAILED DESCRIPTION

Embodiments of the invention described below realise a trade-off between bandwidth utilization of the network and end-to-end queuing delay/packet loss experienced during a communication event (i.e. audio/video call). That is whilst the bandwidth utilization of the network will be lower by a percentage (for example lower by 20%) the end-to-end queuing delay/packet loss in the communication event will be minimized thus avoiding degradation of quality (i.e. audio/video call quality) in the real-time communication event.

Embodiments will now be described by way of example only.

Figure 1:
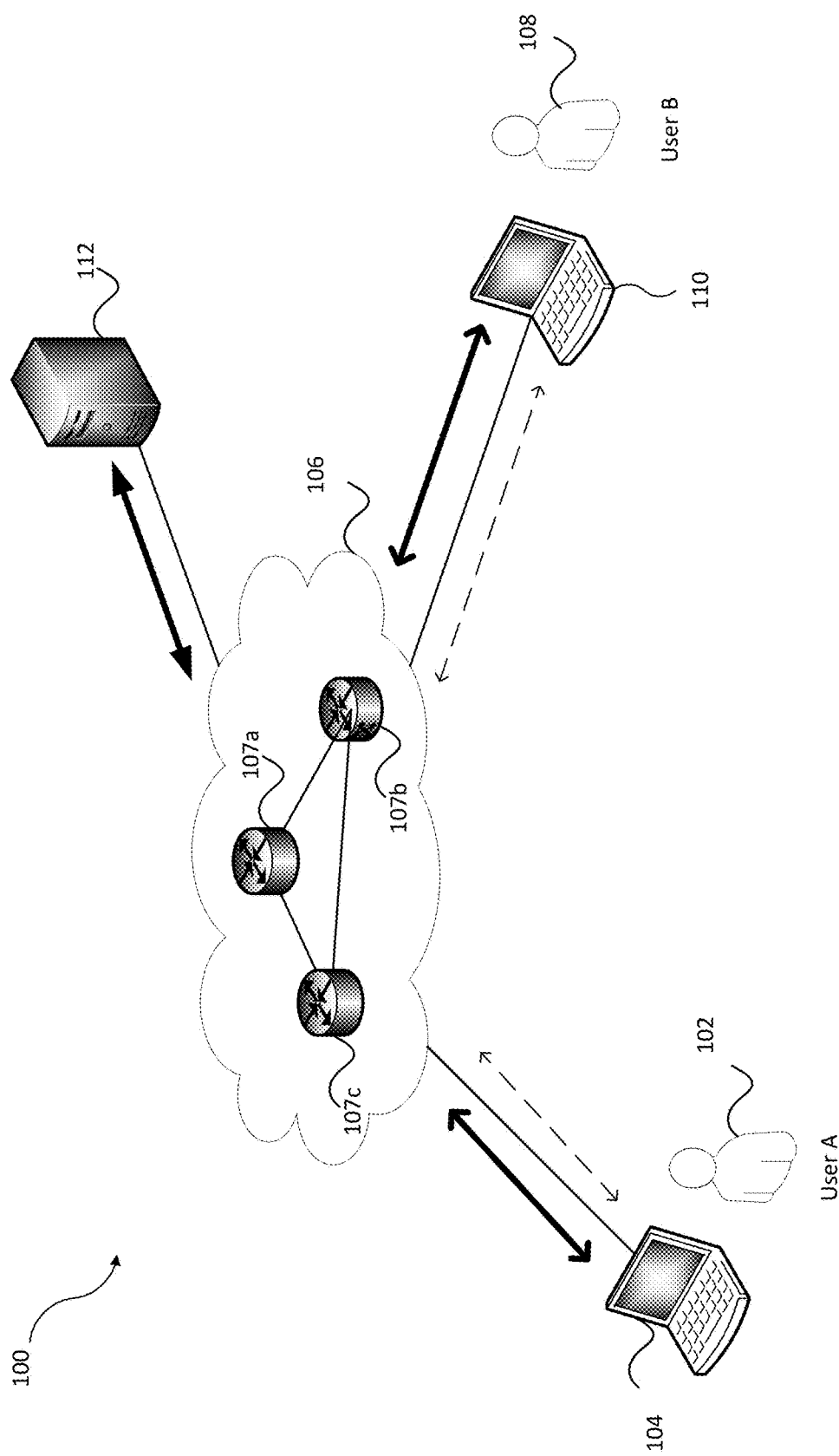
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over a network 106 in the communication system 100, thereby allowing the users 102 and 108 to communicate with each other over the network 106. The communications between users 102 and 108 is represented by the dashed lines in FIG. 1. The network 106 may comprise one or more routing nodes 107 for relaying data between endpoints. FIG. 1 shows the communication system 100 comprising an advertising server which is operated by a service provider to distribute content (i.e. advertisements) to one or more of the users of the communication system. During a communication event between users 102 and 108, the user may share content such as photos, screenshots, and files. The distribution of content from the advertising server and between the users 102 and 108 is represented by the thick lines in FIG. 1.

The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows®, Mac OS® and Linux® PCs), a gaming device, a television, a personal digital assistant ("PDA") or other embedded device able to connect to the network 106. The user device 104 is arranged to receive information from and output information to the user 102 of the user device 104. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Figure 2:
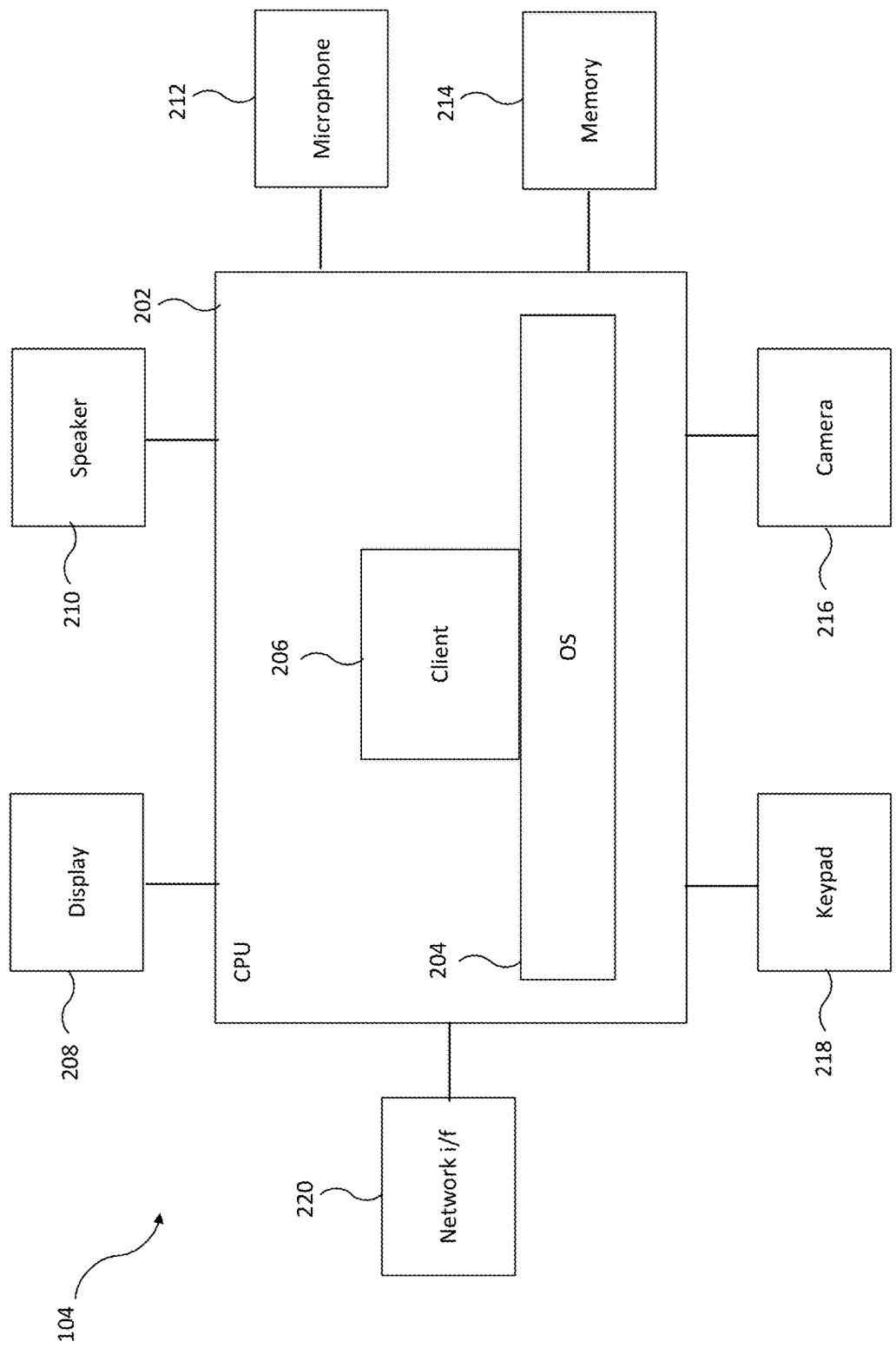
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 104. In this way, the client 206 performs the processing required to allow the user 102 to communicate over the communication system 100.

Figure 3:
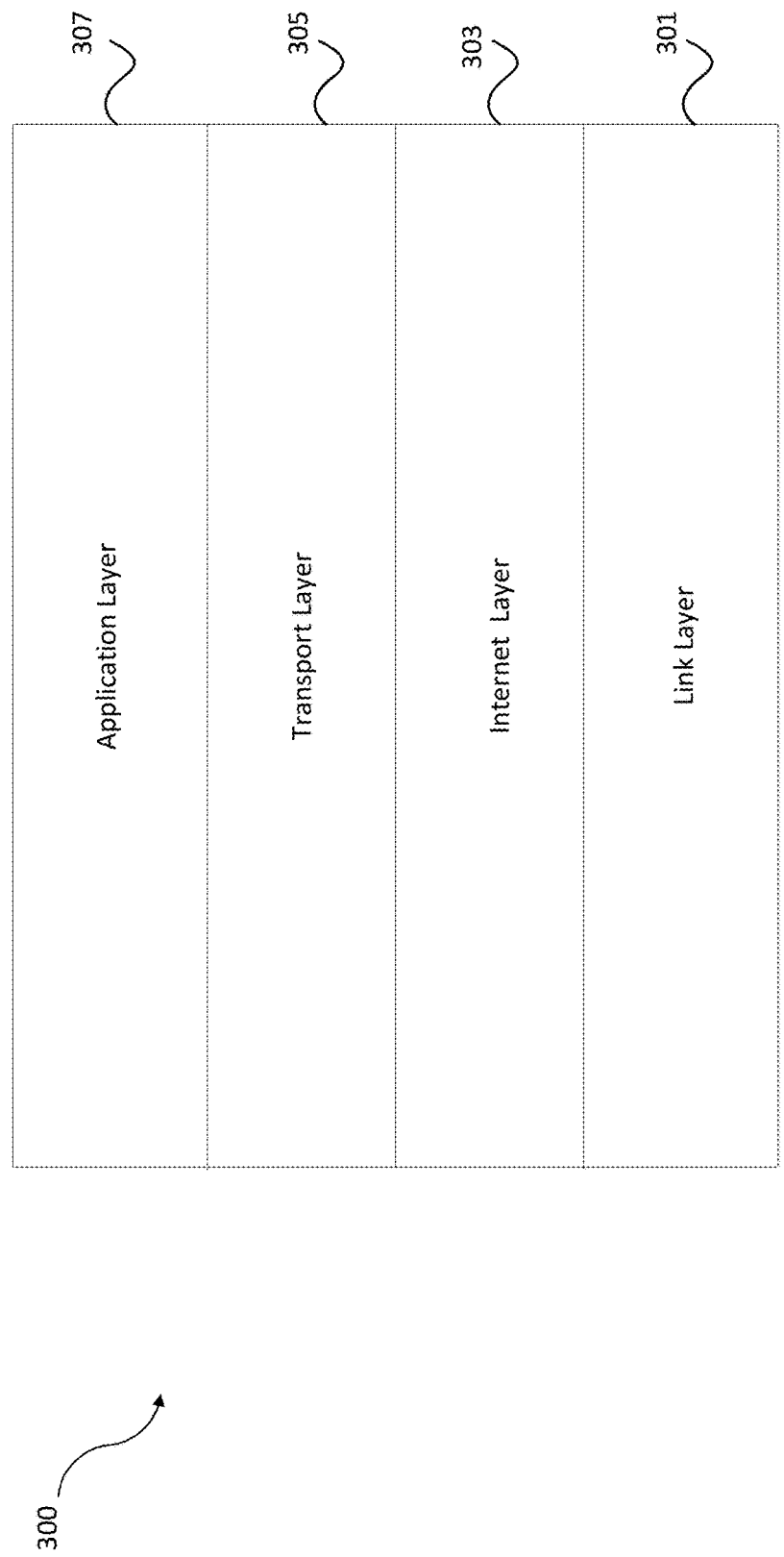
FIG. 3 is a schematic block diagram of a protocol stack.

As will be familiar to a person skilled in the art, the basic mechanism by which user devices can communicate over a network such as the Internet can be considered as a protocol stack (embodied in the software running on each user device). There are a number of different protocol stacks depending on the communication type, but one is shown in FIG. 3 as representative.

In this stack 300, the lowest layer is the link layer 301 which is responsible for conveying bits over an RF link between devices 102 and 110. The link layer 301 is responsible for conveying RF traffic in the form of (typically encoded) bits, modulated onto a carrier frequency.

The internet layer 303 is the packet protocol responsible for immediate packet routing. Those skilled in the art will understand that a packet of data comprises both a header portion and a payload. The header comprises the internetwork address (e.g. IP address) of the destination user device, and the payload comprises the actual user data desired by the communication client application to be transmitted. When a routing node receives a packet, its IP layer software examines the IP address and determines the next adjacent routing node to which to route the packet (or end-user terminal device if the destination device is adjacent).

The transport layer 305 adds additional header information wrapped on top of the IP header to provide services such as port numbering, congestion control and acknowledgement of packet receipt. The transport layer 305 may handle communications according to the transmission control protocol (TCP) or a user datagram protocol (UDP), for example.

TCP service is obtained by both a transmitter and receiver creating end points called sockets. Each socket has a socket number (address) consisting of the IP address of the host and a 16-bit number local to that host called a port. For TCP service to be obtained, a connection must be established between a socket on the transmitting device and a socket on the receiving device. Every TCP socket has a TCP receiving buffer to queue received data (data received over network 106) before it is read from an application operating on the upper application layer 307, and a TCP sending buffer to queue data before it is sent to lower layers in the stack 300 for transmission over network 106.

Finally, the application layer 307 relates to the user information to be included in the packet payload, e.g. audio or video content of a voice or video call, or user text for an IM message. A client application operating on the application layer 307 is free to include any content it wishes in the payload as appropriate to the application in question.

An application operating on the application layer 307 is arranged to read received data from a TCP receiving buffer, and send data to a TCP sending buffer for transmission over network 106.

In embodiments of the invention, conditions of the network 106 are dynamically measured by the communication client 206 and these network conditions are used to determine and limit the rate of TCP cross traffic (i.e. HTTP/HTTPS cross traffic) so that degradation of the concurrent real-time communication event (i.e. voice/video call) may be avoided. The term "TCP cross traffic" is used herein to refer to any data that is transmitted to a receiver using TCP as an underlying transport protocol whilst communication event data is transmitted to the receiver.

Figure 4:
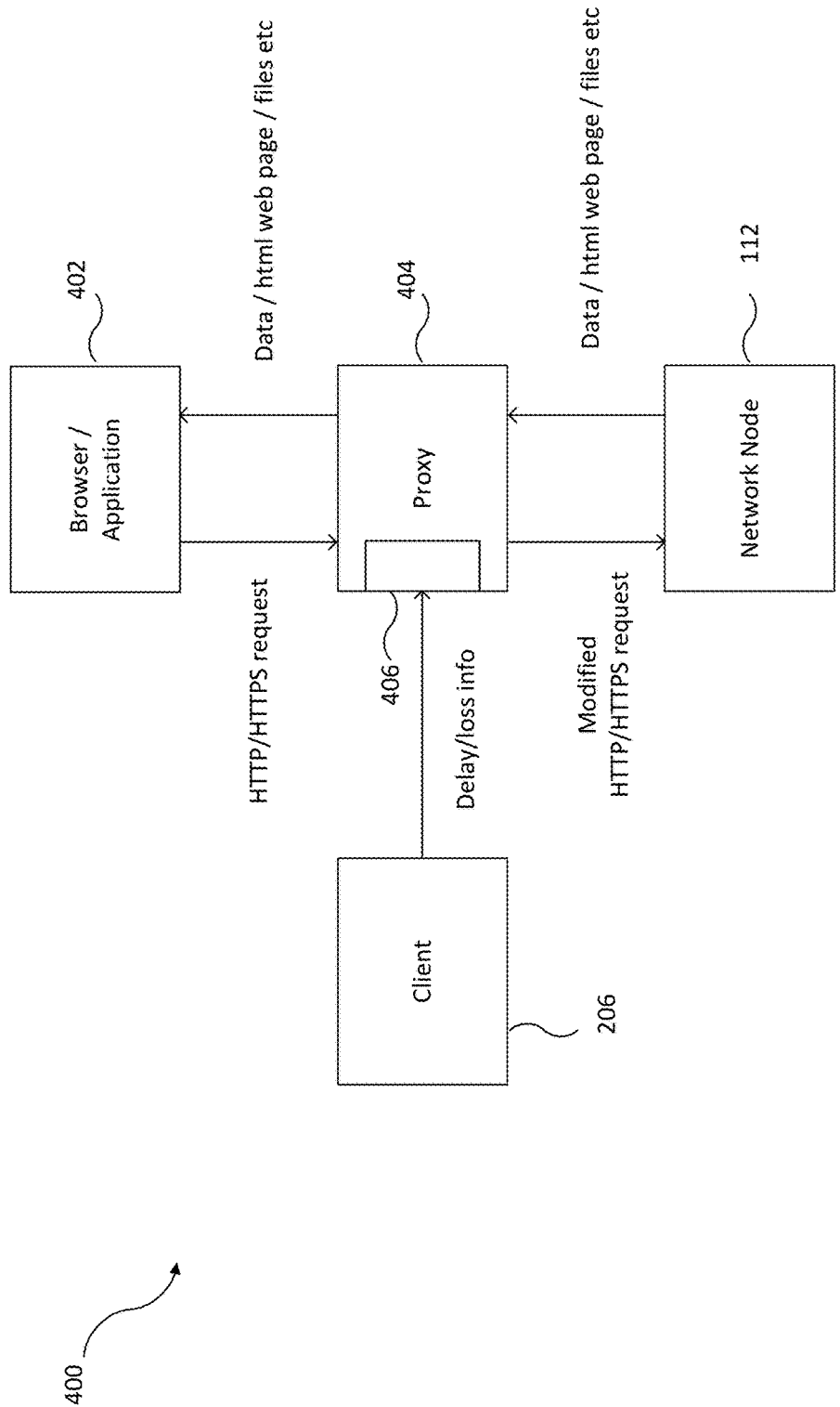
FIG. 4 is a functional diagram of an example architecture.

A functional diagram of an example architecture 400 for implementing the invention is shown in FIG. 4. In this functional diagram, a communication client 206 executed on user device 104 handles a communication event with user device 110 (not shown in FIG. 4). An application layer process 402 is arranged to transmit data to user device 110 via a proxy 404 and/or receive data from a network node 112

(i.e. a remote server or any other type of data centre) or user device 110 during the communication event between user device 104 and user device 110.

The communication client 206 typically hosts a custom browser in order to support various HTTP/HTTPS based web services. The application layer process 402 may be a custom browser hosted by the communication client 206. The custom browser 402 is a user interface provided by the communication client 206 and may be used to present information to the user 102 and to receive information from the user 102. For example the custom browser 402 may be used to display content (i.e. advertisements) received from the network node 112 and to display content (i.e. photos, screenshots, and files) received from user device 110 during the communication event between user device 104 and user device 110. The custom browser is able to send requests using the HTTP/HTTPS protocols using an Application Programming Interface (API) provided by the custom browser or the operating system (e.g. Wininet API in a Microsoft® Windows® system).

The application layer process 402 may alternatively be a web browser (for example Microsoft's Internet Explorer® web browser) running on user device 104. The web browser is able to send requests using the HTTP/HTTPS protocols using an Application programming Interface (API) provided by the web browser or the operating system (e.g. Wininet API) of user device 104.

The application layer process 402 may alternatively be another application (other than communication client 206) executed on the user device 104. This other application is able to send requests using the HTTP/HTTPS protocols using an Application programming Interface (API) provided by the operating system (e.g. Wininet API) of user device 104.

The inventors have recognised that since actual packet sending and arrival information is not available to the application layer (the layer on which the application process 402 is operating on) and the APIs do not provide rate limit options to the application process 402, it is difficult for the application process 402 to perform bandwidth estimation and apply rate limits to the underlying standard TCP connection.

The architecture 400 includes a proxy 404 which is a software program executed on a local processor of the user device 104 and acts as a proxy server. As is well known to persons skilled in the art a proxy server is used in a client/server connection, and acts an intermediary between a "client" and "server". A proxy server accepts requests from a client as if it were a server, then forwards them (possibly modifying them) to the real server, which sees the proxy as a client. The server responds back to the proxy, which forwards the reply back to the client. The proxy may be implemented as part of the functionality of the communication client software 206. Alternatively, the proxy may be separate software program which is arranged to communicate and interact with the communication client software 206.

The proxy 404 comprises a rate controller module 406. The communication client 206 supplies dynamically monitored network condition information to the rate controller module 406. The rate controller module 406 uses a rate control algorithm to determine an appropriate rate limit to data flows in the downlink (TCP data sent from network node 112 to user device 104 or TCP data sent from user device 110 to user device 104) or uplink (TCP data sent from user device 104 to user device 110).

The proxy 404 may be a HTTP/HTTPS proxy in which case the rate controller module 406 uses the rate control algorithm to determine an appropriate rate limit to HTTP/HTTPS data flows.

The application layer process 402 can be programmatically set to use the HTTP/HTTPS proxy 404. As shown in FIG. 4, HTTP/HTTPS requests from the application layer process 402 will be forwarded to the proxy 404. The proxy 404 will set up a TCP connection with the network node 112 (or user device 110), download data from the network node 112 (or user device 110), and supply the downloaded TCP data to the application layer process 402 for display to a user of the user device 104. For example, if the application layer process 402 is a web browser running on the user device 104, if user 102 allows it, the web browser can be programmatically set to use the proxy 404 so all HTTP/HTTPS going through the web browser is under control of the rate controller module 406, the operation of which is described in more detail below.

In the case of using a TCP proxy, the mechanism is applied at the TCP level instead of the HTTP/HTTPS level.

In order to avoided degradation in audio/video communication quality, the rate of TCP cross traffic is controlled by the rate controller module 406 using the rate control algorithm. The rate control algorithm is configured to explore and detect available bandwidth, and dynamically determine the appropriate rate limiting threshold to the TCP cross traffic according to changing network conditions.

In the case of the application layer process 402 downloading content from network node 112 or user device 110, an appropriate rate limit to data flows in the downlink is implemented at the receiving client side of the transmission i.e. at the user device 104. This is due to the network node 112 being operated by a third party (not the service provider providing the communication client 206) and therefore the network node 112 is not under control by any functionality at the user device 104. Due to the properties of the TCP protocol, by controlling the size of the TCP receiving buffer at the transport layer 305 and the speed at which an application layer process 402 operating on the application layer 307 reads data from the TCP receiving buffer, the sending rate of TCP cross traffic at the network node 112/user device 110 side is controlled. This is due to the operation of the TCP protocol. TCP is a sliding window protocol. The window size in sliding window protocols specifies the amount of data that can be sent before the sender has to pause and wait for the receiver to acknowledge them.

In TCP, the number of bytes of data that may be sent at any time before the sender must pause and wait for acknowledgement is limited by two factors: the size of the receiver's TCP receiving buffer, and the size of the sender's TCP sending buffer. The size of the receiver's TCP receiving buffer matters because the sender cannot send more bytes than the receiver has space to buffer; otherwise data is lost. The size of the sender's TCP sending buffer matters because the sender cannot recycle its own buffer space until the receiver has acknowledged the bytes in TCP sending buffer, in case the network loses the data and the bytes must be resent. The sender knows the receiver's remaining buffer size because the receiver advertises this value as the TCP window size in each acknowledgement replied to the sender. The sender always knows its own TCP sending buffer size. But the effective window size used by the sender is actually the minimum of the TCP window size advertised by the receiver, based on the unused space in its TCP receiving buffer, and the sender's own TCP sending buffer size.

Thus, the receiving window size (vacant TCP receiving buffer size) of user device 104 is fed back to the sender (i.e. network node 112 or user device 110), and the sender chooses the minimum of the reported receiving window size (fed back from user device 104) and the sender's own TCP sending buffer size, as the effective window size.

In the case of the user device 104 uploading content to the user device 110, an appropriate rate limit to data flows in the uplink is implemented by directly controlling the TCP sending buffer size of the user device 104 and the speed with which an application operating on the application layer 307 (i.e. the application layer process 402) is sending TCP data to the TCP sending buffer.

Thus in both the uploading and downloading cases, the rate of TCP cross traffic is controlled by determining the appropriate socket receiving/sending buffer size and the rate at which TCP data is read from, or supplied to, the appropriate TCP buffer.

The rate control algorithm executed by the rate controller module 406 is now described. The description of the rate control algorithm is first described with reference to the scenario in which content is downloaded to the user device 104 during a communication event between the user device 104 and user device 110. The content may be downloaded from network node 112 or user device 110.

In this scenario, the rate control algorithm is executed to determine an appropriate TCP socket reading speed (tcp_rate_limit) and TCP receiving buffer size.

During the communication event between the user device 104 and user device 110, the communication client 206 dynamically monitors network conditions based on measurements of the communication event (i.e. voice/video call). In particular, the communication client 206 measures the end-to-end queuing delay (the time it takes for a packet transmitted by a sender to arrive at a receiver) and packet loss experienced over the network 106. Techniques for measuring these network conditions are well known to persons skilled in the art and are therefore not discussed in detail herein.

As shown in FIG. 4, the delay and packet loss information is supplied to the rate controller module 406 which executes the rate control algorithm. The rate control algorithm also monitors the rate at which TCP content data is being received at the TCP receiving buffer of the user device 104 during the download of the TCP content, this observed receiving rate (avg_receving_rate) is calculated by a moving average over samples of the TCP content data. Note that, the observed receiving rate (avg_receving_rate) can be lower than the TCP socket reading speed (tcp_rate_limit) if the TCP socket reading speed is higher than the available bandwidth in the bottleneck and the actual average data arrival rate is lower than the TCP socket reading speed (tcp_rate_limit). However, the observed receiving rate (avg_receving_rate) cannot be higher than the TCP socket reading speed (tcp_rate_limit). If the actual packet arrival rate from the lower layer (internet layer 303) is higher than the TCP socket reading speed (tcp_rate_limit), then the TCP receiving buffer will get full, and the receiving window (vacant TCP receiving buffer size) will become smaller.

The rate control algorithm also tracks the maximum feasible bandwidth of the network 106 by adjusting a parameter max_bandwidth. The value for max_bandwidth may be initialised to a predetermined value and then adjusted accordingly. The value for max_bandwidth is updated using a weighted average equation:

max_bandwidth=[weight*avg_receiving_rate]+[(1−weight)*max_bandwidth]

wherein the weight is a numerical value between 0 and 1 and is adaptive according to the various network conditions such as end-to-end queuing delay and packet loss.

For example, if the observed receiving rate (avg_receving_rate) is larger than the current max_bandwidth, max_bandwidth will be updated using the weighted average equation.

If the observed receiving rate (avg_receiving_rate) is less than the current max_bandwidth, and the end-to-end queuing delay is less than a certain threshold (60 ms for example) and the packet loss is also less than a certain threshold (i.e. there is negligible amount of packet loss), then max_bandwidth will not be updated.

However, if the observed receiving rate (avg_receving_rate) is less than the current max_bandwidth, and the end-to-end queuing delay is higher than a certain threshold (100 ms for example), and/or the packet loss is above a certain threshold (more than 5-10% for example) indicating that heavy packet loss is observed, then max_bandwidth will be updated according to the weighted average equation even though the observed receiving rate (avg_receving_rate) is less than the current max_bandwidth, As indicated above, the weight used in the weighted average equation could be a function of the end-to-end queuing delay, for example, when the observed receiving rate (avg_receving_rate) is less than the current max_bandwidth, and the end-to-end queuing delay is higher than a certain threshold, the weight put on the current average_receiving_rate will increase corresponding to increasing end-to-end queuing delay above the certain threshold. Similarly, the weight used in the weighted average equation could be a function of the observed packet loss, for example, when the observed receiving rate (avg_receving_rate) is less than the current max_bandwidth, and the observed packet loss is higher than a certain threshold, the weight put on the current average_receiving_rate will increase corresponding to increasing packet loss above the certain threshold.

If the observed receiving rate (avg_receving_rate) is lower than the TCP socket reading speed (tcp_rate_limit) and the queuing delay and loss rate are both above respective thresholds, then max_bandwidth will also be updated using the above weighted average equation.

Moreover, careful attention is needed in updating max_bandwidth if the bandwidth of the network 106 is significantly underutilized, for example the network 106 may be in an idle state or the sender may not have enough data to send. The ratio of the observed receiving rate (avg_receving_rate) is compared with the max_bandwidth plays a role in detecting such a case. If the ratio is below a certain threshold, then the chance of the bandwidth of the network 106 being significantly underutilized will be higher. In such a scenario, updating of max_bandwidth is prevented, or put the weight on avg_receiving_rate to be a very low predetermined value.

The TCP socket reading speed (tcp_rate_limit) is calculated based on a weighted average of the observed receiving rate (avg_receiving_rate), certain percentage (about 80% for instance) of max_bandwidth, and the current tcp_rate_limit, according to the different queuing delay, loss rate condition. The TCP socket reading speed (tcp_rate_limit) may be calculated based on the following equation:

tcp_rate_limit=
[weight_1*{weight_2*percentage*max_bandwidth+(1−weight_2)*avg_receiving_rate)}]+[(1−weight_1)*tcp_rate_limit]

By setting this percentage of max_bandwidth, the amount of under-utilization of the available bandwidth of network 106 for the TCP cross traffic is controlled. This percentage may be a function of queuing delay. For example, as the measured queuing delay decreases, the percentage could be increased to enable more sufficient utilization of the bandwidth.

If the queuing delay is rather low with zero or negligible loss rate, which means that the bandwidth of the network 106 is much underutilized, the rate control algorithm will also try to intentionally increase the calculated tcp_rate_limit by a certain percentage. The percentage can be higher at the start up stage to allow a faster rate adapting speed. The increasing percentage can also be adaptive according to the queuing delay and loss level.

The TCP socket reading speed (tcp_rate_limit) is controlled by controlling parameters read_interval_limit and read_block_limit at each time the application layer process 402 tries to read from the TCP receiving socket to retrieve TCP content data from the TCP receiving buffer.

The parameter read_interval_limit is the maximum time interval permitted between separate instances of the application layer process 402 reading from the TCP receiving socket (i.e. reading from the TCP receiving buffer of the TCP receiving socket). The parameter read_block_limit is the maximum amount of data (in bytes) that the application layer process 402 is permitted to read from the TCP receiving socket (i.e. the TCP receiving buffer of the TCP receiving socket) in response to a call to read the TCP receiving socket. The relationship between these parameter is as follows:

$$TCP\ socket\ reading\ speed,\ tcp\_rate_{limit} = \frac{read\_block\_limit}{read\_interval\_limit}$$

The TCP socket reading interval read_interval_limit is a trade-off between reading granularity and code executing frequency. If the read_interval_limit is lower than 20 ms, read_block_limit will be increased by certain bytes. If the read_interval_limit is larger than 100 ms, read_block_limit will be decreased accordingly.

As described above, in addition to determining an appropriate TCP socket reading speed (tcp_rate_limit), the rate control algorithm is also executed to determine an appropriate TCP receiving buffer size (TCPRCVBUFSIZE). The size of the TCP receiving buffer can be controlled using the TCP setting function "setsockopt".

The TCP receiving buffer size determines the maximum possible TCP window size. The TCP window size will influence the data sending burstiness, since it is the amount of data the sender can send out without receiving an acknowledgement from the receiver. High TCP receiving buffer size will create a high delay spike, which is harmful to the real-time call quality. On the other hand, a buffer size setting that is too low may trap the possible TCP sending rate, since the TCP sending rate roughly equals the TCP window size divided by the average round trip time (RTT). Thus it will be apparent to persons skilled in the art that appropriate selection of the TCP receiving buffer size is required. The rate control algorithm achieves this by initially setting the TCP receiving buffer size to be relatively low (for example 4096 bytes), and then gradually increasing the TCP receiving buffer size based on the determined TCP socket reading speed tcp_rate_limit. The TCP receiving buffer size scales linearly with the tcp_rate_limit. That is, as tcp_rate_limit increases, the TCP receiving buffer size will increase accordingly, and when tcp_rate_limit decreases, the TCP receiving buffer size will decrease accordingly. The granularity of the change of buffer size may be set for example to 1024 bytes.

If the observed receiving rate (avg_receiving_rate), is persistently lower than tcp_rate_limit while the queuing delay remains rather low, then the rate control algorithm determines that the TCP receiving buffer size may be underset and increases the TCP receiving buffer size by a predetermined amount step by step in this case.

Whilst the rate control algorithm has been described above with reference to the scenario in which content is downloaded to the user device 104 during a communication event between the user device 104 and user device 110, it will be appreciated that the rate control algorithm is also able to control the rate that TCP cross traffic is uploaded from user device 104 to user device 110 during a communication event between the user device 104 and user device 110. The network conditions (end-to-end queuing delay and packet loss) are dynamically measured for the uplink direction instead of downlink direction. The rate control algorithm receives the dynamically monitored network conditions based on measurements of the communication event (i.e. voice/video call) in order to determine an appropriate TCP socket sending buffer size and the rate at which content data is supplied to the TCP sending buffer (from an application process 402 operating on the upper application layer 307).

More accurate estimation of the end-to-end queuing delay and packet loss will be provided if the communication client 206 at user device 104 side feedbacks these measurements to the proxy 404 as shown in FIG. 4. In case that this feedback of the end-to-end queuing delay and packet loss to the proxy 404 is unavailable, the queuing delay in the uplink direction could be approximately estimated by the proxy 404. The proxy 404 opens a TCP socket and writes data received from an application layer process 402 to the TCP sending buffer. Since the uplink is usually the bottleneck, if the uplink is congested, a queue of data will be built up at the TCP sending buffer. The proxy 404 may then estimate the end-to-end queuing delay based on observations of the data being queued in the TCP sending buffer. The packet loss rate could not be estimated at the sending buffer. Acceptable performance of the uplink rate control is likely to be achieved using this method even without the packet loss rate information being available to the proxy 404, however performance of the uplink rate control may slightly suffer compared to the scenario when the communication client 206 measures and report the end-to-end queuing delay and packet loss to the proxy 404.

In the example described above, it is more convenient to perform rate control at the receiving client side (i.e. at the user device 104), since the network node 112 belongs to third party provider and is out of reach. However, embodiments of the invention are not limited to implementations only at the receiving side and can also be applied at the network node (if the network node is controlled by the same software provider that provides the communication client 206). That is, the network node 112 may perform rate control to limit the uploading rate of TCP data to the user device 104 by determining an appropriate TCP socket sending buffer size (at the network node 112) and the rate at which content data is supplied to the TCP sending buffer (at the network node 112). In this implementation, the communication client may provide the dynamically measured network conditions (end-to-end queuing delay and packet loss) to the network node 112 over the network 106.

In case that this feedback of the end-to-end queuing delay and packet loss to the network node 112 is unavailable, the end-to-end queuing delay could be approximately estimated at the TCP sending buffer at the network node 112, however the packet loss rate could not be estimated at the network node 112. Rate control to limit the uploading rate of TCP data to the user device 104 by determining an appropriate TCP socket sending buffer size and the rate at which content data is supplied to the TCP sending buffer may still be performed in this case using only the estimated end-to-end queuing delay. Acceptable performance of the rate control is likely to be achieved even without the packet loss rate information being available to the network node (i.e. using only the estimated end-to-end queuing delay), however performance of the rate control may slightly suffer.

Whilst FIG. 4 shows the implementation of the rate controller module 406 in the proxy 404, the rate controller module 406 may be implemented as part of the functionality of the communication client 206. In these embodiments, buffer size and rate limit information determined by execution of the rate control algorithm may be supplied from the communication client 206 to the proxy which has rate limiting capability which enables the proxy to receive the appropriate buffer size and rate limit information and set the appropriate buffer size and rate limit accordingly.

The use of HTTP/HTTPS proxy or a TCP proxy is required for an application process 402 operating on the application layer 307 which does not have access to a TCP socket. For example, as described above the application layer process 402 may be an embedded browser hosted by communication client 206, the embedded browser has no access to a TCP socket, therefore a proxy is required to enable access to the lower protocol layers.

FIG. 4 shows the use of proxy 404 however embodiments disclosed herein are not limited to the use of such a proxy. For example an application layer process 402 may have the ability to directly open a TCP socket in order to download or upload TCP content. In such embodiments no proxy is used and the rate controller module 406 is implemented as part of the functionality of the communication client 206. It will appreciated that an application layer process 402 which has the ability to access a TCP socket may still use proxy 404 in order to download or upload TCP content (although the use of a proxy is not required).

Existing commercial web browser products (for example Google Chrome™ and Mozilla Firefox®) may support web call service through the WebRTC standard provided by Google. That is, a real-time communication may be implemented between two end points wherein the real time communication goes through the respective WebRTC compliant browsers. However, the web call quality may be seriously degraded due to the other concurrent web browsing cross traffic. The rate control mechanism could be built into a compliant WebRTC browser to make the browser web-call friendly. The Real-time Transport Protocol (RTP) is required to be implemented as the media transport protocol for WebRTC. RTP itself comprises two parts: the RTP data transfer protocol, and the RTP control protocol (RTCP). The end-to-end queuing delay and packet loss may be measured by a WebRTC browser through which the real-time communication is conducted, and fedback to another WebRTC browser with the rate control mechanism built into it (through which the real-time communication is conducted). The end-to-end queuing delay and packet loss being fedback using the RTCP protocol. The WebRTC browser with in-built rate control mechanism may then perform rate control in accordance with embodiments described above. In this case, a proxy may not be required since the web browser itself handles the HTTP/HTTPS process. As will be apparent, in this implementation a communication client 206 does not handle the real-time communication.

The rate control algorithm described above is configured to operate in a first and second mode. The rate control algorithm operates as described above in the first mode in order to lower the end-to-end queuing delay and packet loss by intentionally underutilizing the available bandwidth. In the second mode, the socket reading speed tcp_rate_limit is set to a predetermined value which is sufficiently high to let the underlying TCP protocol determine the actual sending rate, which is ensured to be TCP friendly. Thus in the second mode the rate control algorithm is not controlling router overflow in the network 106. Therefore it can be seen that whilst in the first mode the algorithm has a conservative approach to handling TCP cross traffic and whilst in the second mode the algorithm has a more aggressive approach to handling TCP cross traffic.

Figure 5:
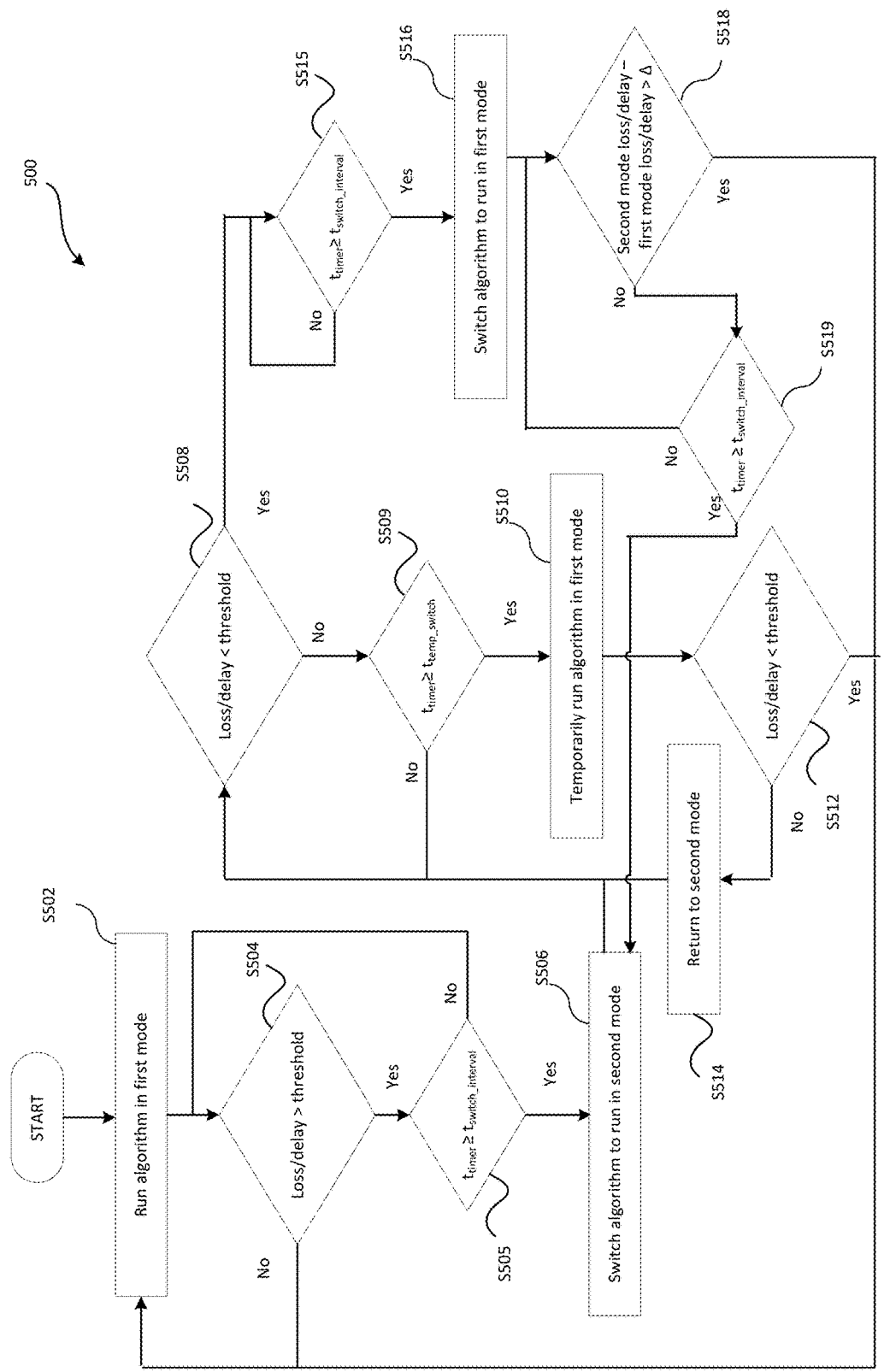
FIG. 5 is flow diagram illustrating an algorithm mode switching mechanism.

The rate control algorithm is configured to switch between operating in the first and second modes, this is now described with reference to a switching process 500 shown in FIG. 5.

At step S502, the rate control algorithm starts operating in the first mode and a timer is started, the time elapsed since the timer being started represented by $t_{timer}$ (this is described in more detail below). At step S504 it is determined whether the measured end-to-end queuing delay and/or packet loss has exceeded respective thresholds for a predetermined proportion of a predetermined time period (the determination at step S504 is not based on a single observation of end-to-end queuing delay and/or packet loss). If it is determined at step S504 that the measured end-to-end queuing delay and/or packet loss do not exceed the respective thresholds for the predetermined proportion of the predetermined time period (i.e. the measurements are not persistently higher than the respective thresholds), then the process 500 proceeds back to step S502 where the rate control algorithm continues to operate in the first mode. The end-to-end queuing delay threshold at step S504 may be set to for example 100 ms and the packet loss threshold at step S504 may be for example in the region of 3-5%. It will be appreciated that these values are merely examples and may be changed according to network type and observations.

If it is determined at step S504 that the measured end-to-end queuing delay and/or packet loss exceed the respective thresholds for the predetermined proportion of the predetermined time period (i.e. the measurements are persistently higher than the respective thresholds) this indicates that there is further TCP cross traffic due to other applications running on the user device 104 (for example a video may be being viewed by a user via a web browser) and the process 500 proceeds to step S505 where the value of $t_{timer}$ is compared to $t_{switch\_interval}$, $t_{switch\_interval}$ representing the time that must elapse before a change in operating mode of the rate control algorithm is permitted to prevent oscillation between the first and second operating modes. The value of $t_{switch\_interval}$ may be set to, for example, at least 10-15 seconds. If the time period $t_{switch\_interval}$ has not yet elapsed at S505, the process 500 proceeds back to S504 where the rate control algorithm double checks that the condition still holds, to avoid reacting to the short term loss/delay spike. When the time period $t_{switch\_interval}$ has elapsed, the process 500 proceeds to step S506 where the rate control algorithm switches to operating in the second mode.

When the rate control algorithm switches to operating in the second mode, the value of $t_{timer}$ is reset and the timer is restarted.

Whilst the rate control algorithm is operating in the second mode it is determined (at step S508) whether the measured end-to-end queuing delay has dropped below a threshold (for example 60 ms) for a predetermined proportion of a predetermined time period (i.e. the end-to-end queuing delay is persistently lower than the delay threshold) and/or whether the packet loss has dropped to zero after expiry of the predetermined time period (the determination at step S508 is not based on a single observation of end-to-end queuing delay and/or packet loss). If it is determined at step S508 that the measured end-to-end queuing delay has not dropped below the respective threshold for the predetermined proportion of the predetermined time period and/or the packet loss has not dropped to zero after expiry of the predetermined time period then the rate control algorithm continues to operate in the second mode and the process 500 proceeds to step S509.

At step S509, the rate control algorithm waits until a period of time ($t_{temp\_switch}$) since entering the second mode has elapsed before proceeding to step S510 where the rate control algorithm temporarily switches back to operating in the first mode. The period of time represented by $t_{temp\_switch}$ may, for example, be 20 seconds. If the time period $t_{temp\_switch}$ has not yet elapsed at S509, the process 500 proceeds back to S508 where the rate control algorithm checks whether network conditions have changed.

After temporarily switching back to operate in the first mode, the rate control algorithm then determines at step S512 whether the end-to-end queuing delay and/or packet loss has dropped below the respective thresholds used at step S504. The temporary switch back to operating in the first mode is implemented because when the rate control algorithm is operating in the second mode, drop in loss/delay may not be sure to be observed even though the cross traffic is gone, since the rate control algorithm will work like TCP when operating in the second mode and so introduce loss and delay.

If the end-to-end queuing delay and/or packet loss has not dropped below the respective thresholds for the end-to-end queuing delay and/or packet loss used at step S504, then the process proceeds to step S514 where the rate control algorithm returns to operating in the second mode.

If the end-to-end queuing delay and/or packet loss has dropped below the respective thresholds for the end-to-end queuing delay and/or packet loss used at step S504, then the rate control algorithm remains operating in the first operating mode. This is represented by the process 500 proceeding back to step S512.

It will be apparent that this further TCP cross traffic may be gone at some point (i.e. a user stops watching the video via the web browser) and therefore there is a need for the rate control algorithm to have the ability to switch back to operating in the first mode. Otherwise, if the algorithm remains in the second mode even if the further TCP cross traffic is gone the underlying TCP protocol will keep introducing delay and loss which will be higher than if switched back to the first mode.

Referring back to step S508, if it is determined at step S508 that the measured end-to-end queuing delay has dropped below the respective threshold for the predetermined proportion of the predetermined time period and/or the packet loss has dropped to zero after expiry of the predetermined time period then, then this indicates that the bandwidth of the network 106 is being underutilized (i.e. a user stops watching the video via the web browser) then the process 500 proceeds to step S515 where the value of $t_{timer}$ is compared to $t_{switch\_interval}$. When the time period $t_{switch\_interval}$ has elapsed since entering the second mode, the process 500 proceeds to step S516 where the rate control algorithm switches back to operate in the first mode.

When the rate control algorithm switches to operating in the first mode, the value of $t_{timer}$ is reset and the timer is restarted.

Once the rate control algorithm switches back to operate in the first mode at step S516, the parameter max_bandwidth is set to be the average of the value for max_bandwidth in the first mode and the previous second mode.

At step S518 the delay and/or loss measured when the rate control algorithm operated in the second mode is compared to the delay and/or loss measured whilst the rate control algorithm is operating in the first mode. If the difference in delay and/or loss between the second and first modes exceeds a predetermined delay and/or loss amount then the process 500 proceeds to step S502 where the rate control algorithm continues to operate in the first mode.

If the delay and/or loss become significantly lower by switching back to the first mode then the rate control algorithm should stay in the first mode. This is represented by the process 500 proceeding back to step S502 (the value of $t_{timer}$ is not reset and the timer is not restarted again as this was done at step S516).

If the delay and loss remains similar, i.e. it is determined at step S518 that the difference in delay and/or loss between the second and first modes does not exceed a predetermined delay and/or loss amount, then the process 500 proceeds to step S519 where the value of $t_{timer}$ is compared to $t_{switch\_interval}$. If the time period $t_{switch\_interval}$ has not yet elapsed at S519, the process 500 proceeds back to S518 where the rate control algorithm checks whether network conditions have changed. Once the time period $t_{switch\_interval}$ has elapsed since entering the first mode, the process 500 proceeds to step S506 where the rate control algorithm switches back to operating in the second mode with the parameter max_bandwidth set to be the average of the value for max_bandwidth in the first mode and the recorded value in the previous second mode.

If the difference in loss and delay is small but the observed receiving rate (avg_receiving_rate), is significantly higher in the second mode then either further TCP traffic exists (i.e. due to other applications running on the user device 104) or the network 106 is of low quality.

This switching mechanism is beneficial even for a low quality network, since the max_bandwidth value is reset in each switching and this helps determine the appropriate available bandwidth. The parameter max_bandwidth will converge to the right operating point. Without the state switching mechanism 500 shown in FIG. 5, the rate control algorithm may not sufficiently utilize the available bandwidth in both the low quality network scenario and the case of existing TCP cross traffic.

A functional diagram of another example architecture 600 for implementing the invention is now described with reference to FIG. 6. In this functional diagram, an application layer process 602 is arranged to transmit data to user device 110 via a proxy 604 and/or receive data from a network node or user device 110 during the communication event between user device 104 and user device 110.

The proxy 604 (which may be a HTTP/HTTPS proxy or a TCP proxy) functions in the same manner as described above with reference to proxy 404. The proxy 604 does not include rate controller module 406 however does have rate limiting capability, which will be described in more detail below. The proxy 604 may optionally report socket data reading/sending information back to the communication client 206. Alternatively the proxy 604 may report to the communication client 206 when data is read from, and sent to the TCP socket.

Figure 6:
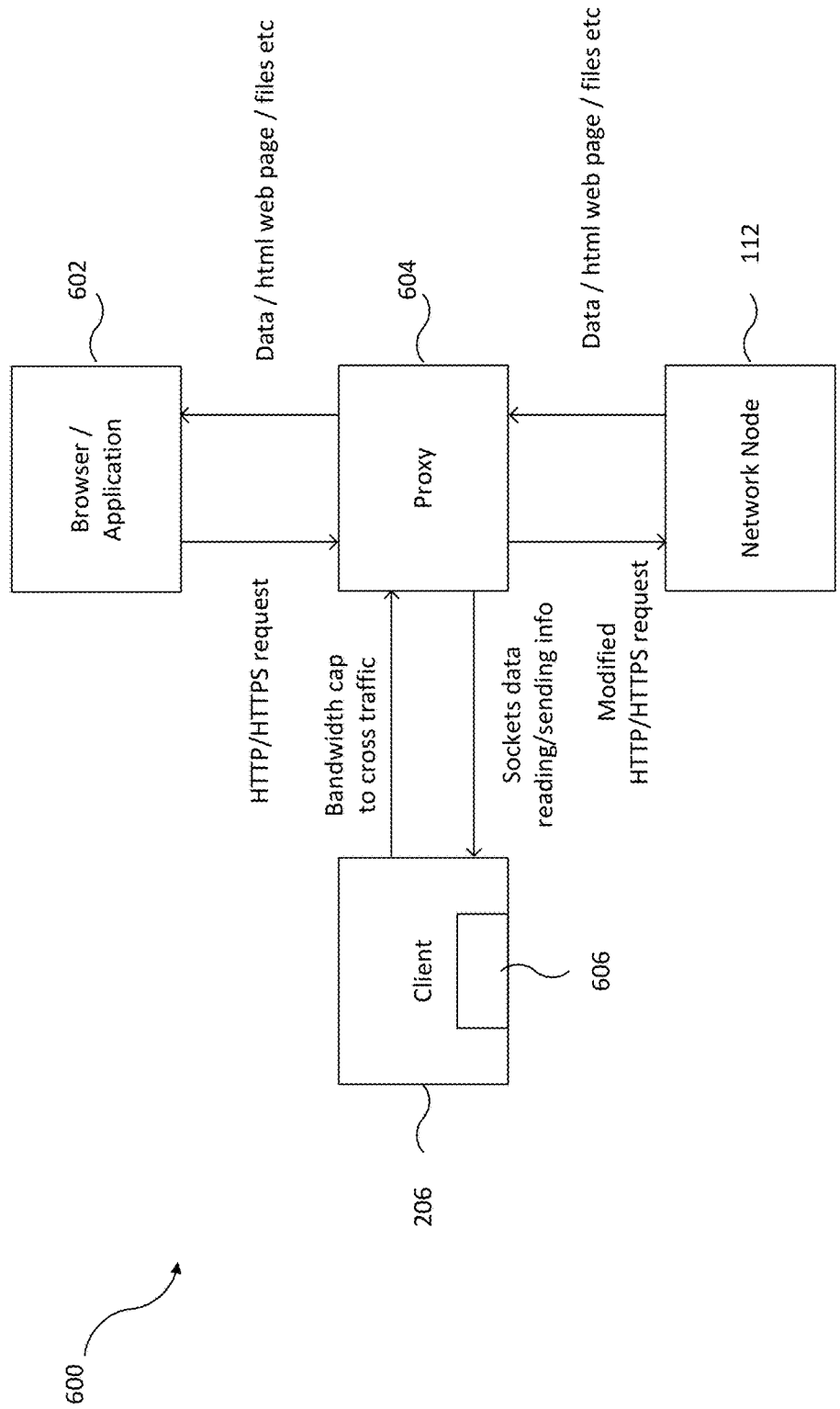
FIG. 6 is a functional diagram of another example architecture.

The communication client 206 shown in FIG. 6 comprises a bandwidth estimation module 606. The bandwidth estimation module 606 is used to dynamically measure network conditions of the network 106. In particular the bandwidth estimation module 606 is configured to estimate the total uplink/downlink bandwidth of the network 106, and then calculate a bandwidth cap for the TCP cross traffic based on the estimated bandwidth. This bandwidth cap is an allocation of the total uplink/downlink bandwidth that may be used for the TCP cross traffic. For example, if the total detected bandwidth is 1 Mbps, the client may allocate 400 kbps for communication traffic, a cap of 400 kbps for TCP cross traffic, and 200 kbps as a margin so that the delay and loss will be minimized.

The bandwidth estimation module 606 may be configured to estimate the bandwidth of the network 106 in a number of different ways. For example, the bandwidth estimation module 606 may be configured to estimate the total uplink/downlink bandwidth by using packet pair/train probing or other existing approaches.

Alternatively, the bandwidth estimation module 606 may be configured to estimate the total uplink/downlink bandwidth by using techniques as described for example in U.S. Pat. No. 8,259,570. If the proxy 604 is configured to report the socket data reading/sending information back to the communication client 206, the proxy 604 reports to the bandwidth estimation module 606 when bytes are read from (downlink), or sent to (uplink), the TCP socket, and these bytes are incorporated into the bandwidth estimation as "side traffic".

Alternatively, the bandwidth estimation module 606 may be configured to estimate the total uplink/downlink bandwidth by using any known method and then add the sending/receiving TCP rate to it. The sending/receiving TCP rate may be reported to the bandwidth estimation module 606 by the proxy 604. Alternatively the sending/receiving TCP rate is calculated by the bandwidth estimation module 606 based on the proxy 604 reporting when data is read from, and sent to the TCP socket.

Alternatively, the bandwidth estimation module 606 may be configured to estimate the total uplink/downlink bandwidth by using any known method. We assume the observed receiving rate (avg_receving_rate) equals the TCP rate limit tcp_rate_limit and add that to the estimate. This method has the advantage that the proxy 604 does not have to report anything about when data is read from, and sent to the TCP socket.

The calculated bandwidth cap for the TCP cross traffic is then supplied to the proxy 604. The proxy 604 then controls the uplink/downlink rate of TCP cross traffic by determining the appropriate socket receiving/sending buffer size and the rate at which TCP data is read from, or supplied to, the appropriate TCP buffer in accordance with the bandwidth cap received from the communication client 206.

FIG. 6 shows the use of proxy 604 however embodiments disclosed herein are not limited to the use of such a proxy. For example, if an application layer process 602 has direct control over the TCP socket then proxy 604 is not required.

Generally, any of the functions described herein (e.g. the functional modules shown in FIGS. 4 and 6) can be implemented using software, firmware, hardware (e.g., fixed logic circuitry), or a combination of these implementations. The modules and steps shown separately in FIGS. 4-6 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Embodiments have been described above in which the rate of TCP cross traffic is controlled by determining the appropriate socket receiving/sending buffer size and the rate at which TCP data is read from, or supplied to, the appropriate TCP buffer. The rate of TCP cross traffic may be controlled by only limiting the rate at which TCP data is read from, or supplied to, the appropriate TCP buffer. However by additionally controlling the receiving/sending buffer size the traffic rate will be much smoother with a less bursty rate and queuing delay spike providing improved quality in the concurrent audio/video call.

The invention claimed is:

1. A method of controlling a receive rate that content data is received at a receiver over a network, wherein the receiver has caused a first stream of real-time communication event data to be received at the receiver, and a second stream of content data to be received at the receiver, the method comprising steps of:

dynamically measuring network conditions of the network based on the real-time communication event data, said dynamically measuring including dynamically measuring an end-to-end queuing delay and a network packet loss of the network based on the real-time communication event data, the real-time communication event data corresponding to an audio or video call between a first user device at which the receiver is implemented and a second user device;

estimating a maximum bandwidth of the network based on the dynamically measured network conditions; and executing a rate control algorithm, during the audio or video call, the rate control algorithm configured to:

operate in a first mode to underutilize the maximum bandwidth of the network by limiting the receive rate to a predefined portion of the maximum bandwidth; and responsive to one or more of the dynamically measured network conditions exceeding a threshold for a predefined portion of a predefined time period, switch to operating in a second mode to control the receive rate by limiting a read rate that the content data is read from a read buffer at the receiver.

2. The method of claim 1, wherein the steps are performed at the receiver and in the second mode the receive rate is controlled by the receiver limiting the read rate that the content data is read from the read buffer.

3. The method of claim 2, wherein the receive rate is limited in the first mode by the receiver controlling a size of the read buffer configured to queue said content data.

4. The method of claim 2, wherein a communication client application executed at the receiver dynamically measures the network conditions of the network by measuring the end-to-end queuing delay and the packet loss of the network based on the real-time communication event data.

5. The method of claim 4, wherein the communication client application performs the step of limiting the receive rate in the first mode, or wherein the method further comprises the step of reporting, by the communication client application, the dynamically measured network conditions to proxy software executed at the receiver, said proxy software performing the step of limiting the receive rate in the first mode.

6. The method of claim 1, wherein the step of dynamically measuring network conditions of the network based on the real-time communication event data is performed at said receiver, and the step of limiting the receive rate in the first mode is performed at a network node, wherein the dynamically measured network conditions of the network are reported by the receiver to the network node.

7. The method of claim 1, wherein said steps are performed at a network node.

8. The method of claim 7, wherein the real-time communication event data is received at the receiver over the network from the second user device during the real-time communication event between the receiver and the second user device and the content data is transmitted from the network node to the receiver.

9. The method of claim 1, wherein the steps are performed at a transmitter and the content data is queued in a send buffer at the transmitter prior to transmission to the receiver, said operating in the second mode further controls an uploading rate at the transmitter by limiting the uploading rate that the content data is sent to the send buffer at the transmitter.

10. The method of claim 9, wherein the uploading rate is controlled by the transmitter limiting a size of the send buffer configured to queue the content data.

11. The method of claim 9, wherein the real-time communication event data is transmitted from the transmitter to the receiver over the network during a real-time communication event between the transmitter and the receiver, and the content data is transmitted from the transmitter to the receiver over the network.

12. The method of claim 9, wherein a communication client application executed at the transmitter dynamically measures the network conditions of the network.

13. The method of claim 12, wherein the communication client application reports the dynamically measured network conditions to proxy software executed at the transmitter.

14. The method of claim 1, wherein the content data is transported over the network in accordance with the Transport Control Protocol.

15. The method of claim 14, wherein the rate control algorithm enables the Transport Control Protocol to determine the receive rate whilst operating in the second mode.

16. The method of claim 1, wherein said estimating the maximum bandwidth of the network further comprises weighting the maximum bandwidth to account for the end-to-end queuing delay and the network packet loss of the network.

17. The method of claim 1, wherein said limiting the receive rate in the first mode further comprises weighting the maximum bandwidth to account for the dynamically measured network conditions.

18. A computer-readable storage medium comprising instructions stored thereon that, responsive to execution by one or more processors implemented at a receiver, is configured to:

dynamically measure network conditions of a network based on real-time communication event data, including dynamically measuring at least an end-to-end queuing delay and a network packet loss of the network based on the real-time communication event data, the real-time communication event data corresponding to an audio or video call between a first user device at which the receiver is implemented and a second user device;

estimate a maximum bandwidth of the network based on the dynamically measured network conditions; and execute a rate control algorithm configured to operate in a first mode to underutilize the maximum bandwidth of the network by limiting a receive rate that content data is received to a predefined portion of the maximum bandwidth, and responsive to one or more of the dynamically measured network conditions exceeding a threshold for a predefined portion of a predefined time period, switch to operate in a second mode to control the receive rate that the content data is received by limiting a read rate that the content data is read from a read buffer at the receiver.

19. A receiver comprising:

a network interface configured to receive a first stream of real-time communication event data and a second stream of content data over a network, the first stream of real-time communication event data corresponding to an audio or video call between a first user device at which the receiver is implemented and a second user device;

a measurement module configured to dynamically measure network conditions of the network based on the real-time communication event data, including dynamically measuring at least an end-to-end queuing delay and a network packet loss of the network based on the real-time communication event data; and a rate limiting module configured to operate in a first mode to underutilize an estimated maximum bandwidth of the network by limiting a receive rate that the content data is received at the receiver to a predefined portion of the estimated maximum bandwidth of the network, and responsive to one or more of the dynamically measured network conditions exceeding a threshold for a predefined portion of a predefined time period, switching to operate in a second mode to control the receive rate that the content data is received by limiting a read rate that the content data is read from a read buffer.

* * * * *